Oct. 20, 1936.  J. A. STUARD  2,058,189
SEPARATOR
Filed Oct. 24, 1933
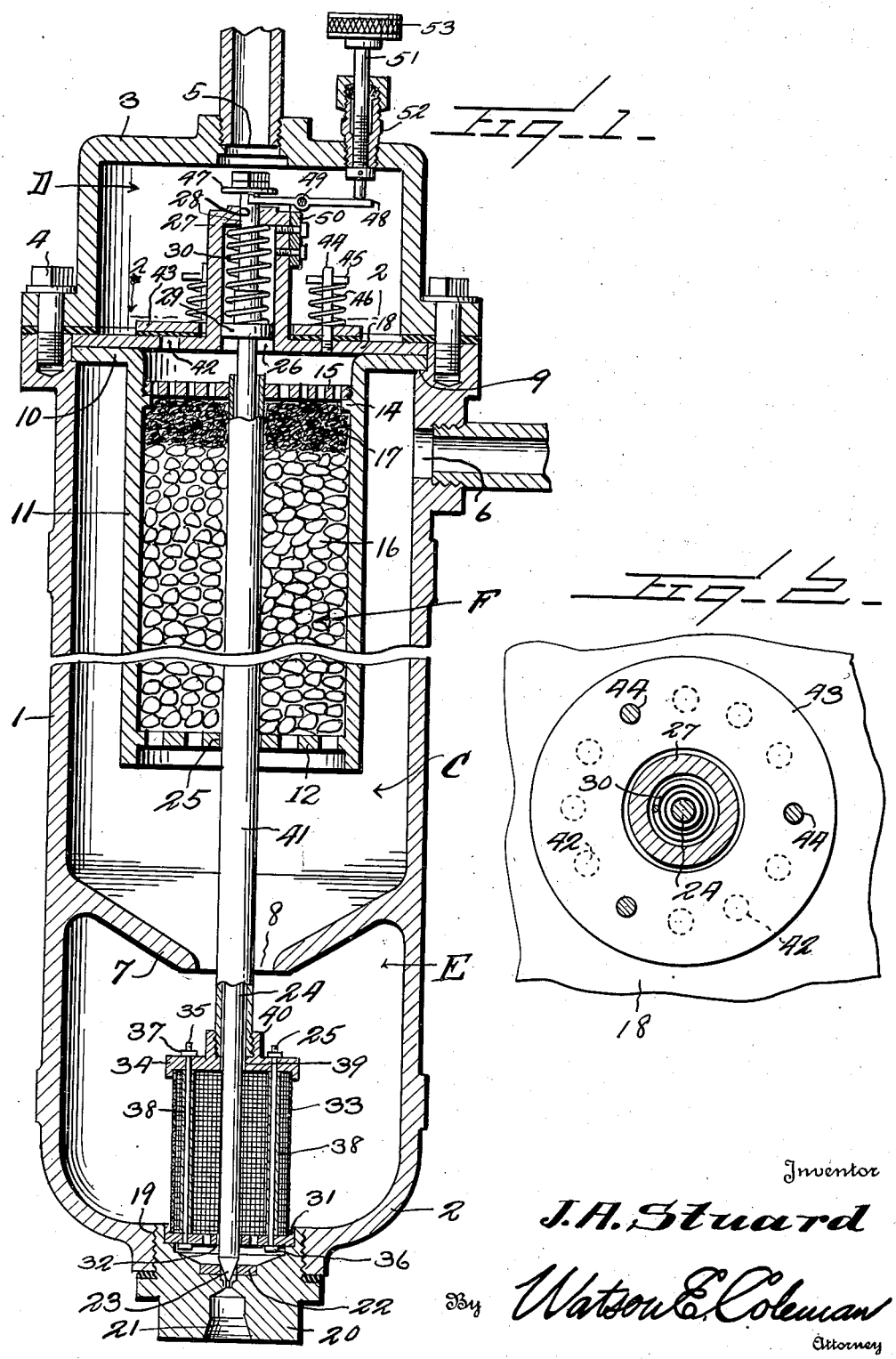

Patented Oct. 20, 1936

2,058,189

UNITED STATES PATENT OFFICE 2,058,189

SEPARATOR

James A. Stuard, Roaring Spring, Pa.

Application October 24, 1933, Serial No. 695,031

5 Claims. (Cl. 137—103)

This invention relates to a separator which is an improvement on the separator as comprised in my Patent #1,937,855 issued December 5, 1933, and it is an object of the invention to provide a device of this kind comprising a casing divided into a separating chamber and a dry air chamber, one in communication with the other, and wherein the casing has an inlet port for the air stream in communication with the separating chamber and an outlet port for the air stream in communication with the dry air chamber with means controlled by the flow of the air stream for maintaining in open position the controlling valve for the vent opening of the casing while the air stream is flowing.

Another object of the invention is to provide a separator of this kind comprising a container divided into a separating chamber and a dry air chamber, one in communication with the other, together with means for preventing retrograde flow from the air chamber into the separating chamber, the separating chamber having in communication therewith an inlet port for the air stream and the dry air chamber having an outlet port for the air stream.

The invention consists in the details of construction and in the combination and arrangement of the several parts of my improved separator whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view partly in section and partly in elevation illustrating a separator constructed in accordance with an embodiment of my invention;

Figure 2 is a fragmentary horizontal sectional view taken substantially on the line 2—2 of Figure 1.

As disclosed in the accompanying drawing, the separator comprises a casing or shell 1 of desired configuration having one end 2 permanently closed while the opposite end is initially open but adapted to be closed by a cap 3 removably held to the open end portion of the shell or casing 1 by the bolts 4. The cap 3 in its central part is provided with an outlet port 5 while the side wall of the casing or shell 1 in relatively close proximity to its initially open end is provided with an inlet port 6.

The lower portion of the shell or casing 1 has disposed thereacross a partition 7 dividing the casing or shell 1 into an upper separating chamber C and a lower elimination chamber E. These two chambers are in communication through the opening 8 herein disclosed as centrally arranged with respect to the partition 7 and as illustrated this partition 7 is in the form of an inverted truncated cone.

The casing or shell 1 closely adjacent to its upper or initially open end is provided therearound with an internal shoulder 9 upon which is rested the outer marginal portion of a flange 10 extending outwardly and laterally from the upper end portion of a tubular member 11. The interior of this member 11 constitutes a filtering chamber F and the lower end of the member 11 is intersected by a perforated head 12. Adjacent its opposite or upper end the member 11 is provided with an internal flange 14 with which engages a perforated head 15 threading within the member 11 or otherwise detachably held in applied position. The major portion of the chamber F is filled with pebbles 16 and interposed between the pebbles 16 and the applied head 15 is a packing or lamination 17 of ginned wool or other shredded fibrous material.

Overlying the flange 10 and in direct contact therewith is the marginal portion of a plate 18, the outer face of which being substantially flush with the adjacent end face of the casing or shell 1, and this plate 18 closes the inner face of the cap 3 whereby the interior of the cap 3 constitutes a dry air chamber D with which communicates the outlet port 5 hereinbefore referred to.

Disposed through the closed end 2 of the casing or shell 1 is an opening 19 into which is threaded or otherwise engaged a plug 20. The central portion of this plug 20 has directed therethrough a drain opening 21 provided intermediate its ends with an internal valve seat 22 with which coacts a needle valve 23 provided at an end portion of an elongated valve rod 24. This valve rod 24 is of a length to extend up through the chamber C and through the chamber F into the chamber D, the heads 12 and 15 associated with the member 11 being provided with suitably positioned openings 25 to allow for the passage therethrough of the rod 24.

The plate 18 is also provided with a relatively large opening 26 through which the rod 24 passes. The opening 26 is defined by a barrel 27 extending inwardly of the dry air chamber D and the outer end of this barrel 27 is closed except for the opening 28 through which the rod 24 is continued. Carried by the rod 24 is a piston 29 which snugly engages within the barrel 27 and interposed between the piston 29 and the closed end of the barrel 27 is an expansible member 30 herein disclosed as a coil spring which is of sufficient tension when the pressure in the chambers C and D is equalized as upon closing of the flow out through the outlet port 5 to return the needle valve 23 to its seat and to maintain said valve in closed position.

Fitting within the upper portion of the plug 20 is a spider 31 provided with a central opening 32 through which the rod 24 is freely directed and whereby the applied spider 31 serves as a guide for the lower end portion of the rod 24 or that portion of the rod 24 immediately adjacent to the needle valve 23.

The applied spider 31 or perforated plate, as it may also be termed, provides a seat for a cylindrical screening unit or element 33 on the top of which is fitted a flat plate or cap 34. Connecting the applied plate or cap 34 and the spider 31 are the holding rods 35 each of which having threaded on one extremity a nut 36 engaging the spider or plate 31 from below and upon its opposite extremity with a nut 37 engaging the plate or cap 34 from above. Each of these rods 35, as herein disclosed, is surrounded by a tube or sleeve 38 bridging the space between the applied spider or plate 31 and plate or cap 34 thus relieving the screening unit or element 33 of load.

The central portion of the plate or cap 34 is provided with an opening 39 through which the rod 24 freely passes and whereby this applied plate or cap 34 also provides a guide for the lower portion of the rod 24.

Surrounding the opening 39 in the plate or cap 34 is an upstanding nipple 40 herein disclosed as integrally formed with the plate or cap 34 and threading into or otherwise secured within the nipple 40 is the lower end portion of a tubular member 41 through which the rod 24 is freely inserted. This tubular member 41 is of a length to extend up through the openings 25 in the heads 12 and 15 of the member 11 whereby desired freedom of movement of the rod 24 through the member 11 is assured.

It is of particular importance that this tubular member 41 does not extend down to a point closely adjacent to the spider or plate 31 because under such conditions there is a possibility of moisture working up through the tubular member 41 between the interior wall of said member and the periphery of the rod 24 and thus being carried up into the dry air chamber D and out through the port 5 to the work and thus to a certain extent probably impair the efficiency of the separator.

Outwardly of the barrel 27 the plate 18 is provided with a series of openings 42 affording communication between the chambers F and D and coacting with and common to all of these openings 42 is a non-return valve 43, herein disclosed as a flat annular member of required dimensions, and freely extending through this annular valve at desired points thereof is a plurality of upstanding pins 44 carried by the plate 18. The outer end portion of each of these pins is provided with a cross member or head 45 and interposed between this cross member or head 45 and the valve 43 is an expansible member 46, herein disclosed as a coil spring, encircling the pin 44 and of desired tension. Each of these springs provides an effective medium for maintaining the valve 43 closed with respect to the openings 42.

An end portion of the rod 24 above the barrel 27 carries an enlargement or head 47 with which engages from below an end portion of a rock lever 48. As illustrated in Figure 1 this lever 48 intermediate its ends, as at 49, is pivotally connected for rocking movement with a plate 50 bolted or otherwise secured to the side wall of the barrel 27. The outer end portion of this lever 48 is adapted to be engaged from above by the inserted end portion of a shank 51.

This shank 51 is threaded through a bushing 52 extending through the wall of the cap 3 and the outer or exterior end of the shank 51 is provided with a head 53 whereby the shank 51 may be readily operated to swing the lever 48 in a direction to effect a manual lifting of the valve 23 and for maintaining said valve in its lifted or open position. Upon movement of the shank 51 in the opposite direction the spring 30 hereinbefore referred to will, of course, operate automatically to return the valve 23 to closed position. When the device is normally functioning the shank 51 is in a position to offer no hindrance or obstruction to the automatic operation of the rod 24.

As the air stream is flowing through the casing or shell 1 said stream will pass up through the chamber F whereby any foreign particle therein will be readily filtered out by the pebbles 16 and the packing 17 and the pressure of the air from below upon the piston 29 will move the piston 29 together with the rod 24 against the tension of the spring 30 and thereby lift the valve 23 into open position. It is believed to be obvious that when the air stream is flowing through the casing or shell 1 there is unhindered flow through the outlet port 5 thus assuring reduction of pressure in the chamber D and as the air pressure is greater than the resistance offered by the spring 30, the desired lifting of the valve 23 is assured. The greater pressure within the chamber C will also lift the valve member 43 so that the air will readily flow into the dry air chamber D and out through the port 5.

When the valve 23 is in open position, the opening 21 will operate as a vent to break the suction action of the air stream flowing through the casing or shell 1 to allow separation of the moisture from the air stream and which moisture will precipitate within the elimination chamber E and drain out through the opening 21. Just as soon, however, as the air stream stops flowing, as by closing the valve comprised in the tool or appurtenance with which the port 5 communicates, the pressure within the chambers C and D will equalize and the valve member 43 will return to closed position, as illustrated in Figure 1, while the valve 23 will be automatically returned to its seat by the spring 30 to close the opening 21 and thus prevent loss of air out through such opening. In the present embodiment of the invention the rod 24 fits sufficiently loose through the outer closed or head end of the barrel 27 so that no resistance will be offered to the outward movement of the piston 29 and, of course, the rod 24 when the port 5 is open for flow therethrough with resultant reduction of pressure in the chamber D with respect to the pressure in the chamber C. This loose fitting of the rod 24 is the equivalent and equally as efficient as providing a port in the closed or head end of the barrel 27.

By providing the openings 42 for the air to flow from the chamber F into the chamber D, it has been found in practice that this effectively prevents any chattering of the rod 24 which might result in a temporary closing of the valve 23 with resultant impairment of the efficiency of the apparatus.

This application is a continuation in part of my application Serial No. 622,551 filed July 14, 1932, the same having issued on December 5, 1933 as Patent #1,937,855, insofar as pertains to the screening or separating unit for the vent opening an embodiment of which feature being included in this prior application but not claimed.

From the foregoing description it is thought to be obvious that a separator constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An apparatus for removing moisture from a flowing stream of compressed air comprising a casing divided into a separating chamber and a dry air chamber, said chambers being in communication, a valve automatically closing said communication when the pressure in the chambers is equalized, said valve moving into open position when the pressure in the dry air chamber is reduced, said casing having an inlet port for the air stream in communication with the separating chamber and an outlet port for the air stream in communication with the dry air chamber, said casing also having a vent opening, a valve for the vent opening, and means entirely controlled by the flow of the air stream for maintaining the valve in open position while the air stream is flowing, said valve returning to closed position when said air flow is stopped.

2. An apparatus for removing moisture from a flowing stream of compressed air comprising a casing, a plate dividing the casing into a separating chamber and a dry air chamber, said plate having an opening affording communication between said chambers, the casing having an inlet port for the air stream in communication with the separating chamber and an outlet port for the air stream in communication with the dry air chamber, said casing also having a vent opening in communication with the separating chamber, a valve for the vent opening including a rod, a barrel carried by the plate and into which said rod extends, said barrel having its outer portion in communication with the separating chamber, a piston within the barrel and carried by the rod whereby the valve is maintained in open position when the air stream is flowing through the separating chamber.

3. An apparatus for removing moisture from a flowing stream of compressed air comprising a casing, a plate dividing the casing into a separating chamber and a dry air chamber, said plate having an opening affording communication between said chambers, the casing having an inlet port for the air stream in communication with the separating chamber and an outlet port for the air stream in communication with the dry air chamber, said casing also having a vent opening in communication with the separating chamber, a valve for the vent opening including a rod, a barrel carried by the plate and into which said rod extends, said barrel being in communication with the separating chamber, a piston within the barrel and carried by the rod whereby the valve is maintained in open position when the air stream is flowing through the separating chamber, the opening affording communication between the chambers being independent of the barrel.

4. An apparatus for removing moisture from a flowing stream of compressed air comprising a casing, a plate dividing the casing into a separating chamber and a dry air chamber, said plate having an opening affording communication between said chambers, the casing having an inlet port for the air stream in communication with the separating chamber and an outlet port for the air stream in communication with the dry air chamber, said casing also having a vent opening in communication with the separating chamber, a valve for the vent opening including a rod, a barrel carried by the plate and into which said rod extends, said barrel having its outer portion in communication with the separating chamber, a piston within the barrel and carried by the rod whereby the valve is maintained in open position when the air stream is flowing through the separating chamber, and means for returning the valve to closed position when the air flow is stopped.

5. An apparatus for removing moisture from a flowing stream of compressed air comprising a casing divided into a separating chamber and a dry air chamber, a barrel in communication with the separating chamber and the dry air chamber, the casing having an inlet port for the air stream in communication with the separating chamber and an outlet port for the air stream in communication with the dry air chamber, said casing also having a vent opening in communication with the separating chamber, a valve for the vent opening including a rod extending into the barrel, a piston within the barrel and movable with the rod whereby the valve is maintained in open position when the air stream is flowing through the separating chamber and the dry air chamber and through the outlet port, said chambers being in communication otherwise than through the barrel.

JAMES A. STUARD.